United States Patent
Rissi et al.

(10) Patent No.: US 9,206,563 B1
(45) Date of Patent: *Dec. 8, 2015

(54) ADJUSTABLE SPINNER FOR A PARTICULATE MATERIAL SPREADER

(75) Inventors: Matthew W. Rissi, Hiawatha, IA (US); Richard Serbousek, Swisher, IA (US)

(73) Assignee: HIGHWAY EQUIPMENT COMPANY, Cedar Rapids, IA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 11/695,760

(22) Filed: Apr. 3, 2007

Related U.S. Application Data

(63) Continuation of application No. 10/248,368, filed on Jan. 14, 2003, now abandoned, which is a continuation of application No. 09/574,600, filed on May 19, 2000, now Pat. No. 6,517,281.

(51) Int. Cl.
*E01C 19/20* (2006.01)
*A01C 19/02* (2006.01)
*A01C 17/00* (2006.01)

(52) U.S. Cl.
CPC ............. *E01C 19/203* (2013.01); *A01C 17/001* (2013.01); *A01C 17/005* (2013.01); *A01C 19/02* (2013.01); *E01C 2019/2075* (2013.01)

(58) Field of Classification Search
CPC .... A01C 17/00; A01C 17/001; A01C 17/005; A01C 19/02; E01C 19/20; E01C 19/202; E01C 19/203; E01C 2019/207; E01C 2019/2075
USPC .................................................. 239/681–688
See application file for complete search history.

(56) References Cited

U.S. PATENT DOCUMENTS

| 1,644,031 | A | | 10/1927 | Pulliam |
| 1,715,325 | A | | 5/1929 | Hayden |
| 2,565,427 | A | | 8/1951 | Herd |
| 2,886,334 | A | | 5/1959 | Presler |
| 3,189,355 | A | * | 6/1965 | Swenson et al. ............. 239/657 |
| 3,618,824 | A | | 11/1971 | Seymour |
| 3,652,019 | A | | 3/1972 | Van Der Lely |

(Continued)

FOREIGN PATENT DOCUMENTS

| CA | 2206630 | 6/1998 |
| GB | 2120914 | 5/1983 |

(Continued)

OTHER PUBLICATIONS

Deposition of Stanley R. Duncalf taken on Jan. 29, 2004 (432 pages).

(Continued)

*Primary Examiner* — Christopher Kim
(74) *Attorney, Agent, or Firm* — Reed Smith, LLP

(57) ABSTRACT

An improved particulate material spreader includes an adjustable spinner apparatus which is incrementally adjustable forwardly and rearwardly to a plurality of operating positions relative to the discharge end of the material conveyor. The adjustment may be manual or automatic to adjust the drop point of the material onto the spinners, thereby accommodating varying application rates of the particulate material on a field, lawn, road, or other area. The spreader may be operatively connected to a microprocessor to receive data input and sensor feedback for variable rate technology.

2 Claims, 8 Drawing Sheets

(56) References Cited

U.S. PATENT DOCUMENTS

| | | | |
|---|---|---|---|
| 3,703,260 | A | 11/1972 | Grabske |
| 3,746,264 | A | 7/1973 | Diener et al. |
| 3,790,090 | A | 2/1974 | Lorenc et al. |
| 3,889,883 | A | 6/1975 | Anderson |
| 3,966,124 | A | 6/1976 | Sukup |
| 4,124,167 | A | 11/1978 | Coleman |
| 4,169,559 | A | 10/1979 | McKee |
| 4,186,885 | A | 2/1980 | Christian |
| 4,216,914 | A | 8/1980 | O'Hanlon |
| 4,266,731 | A | 5/1981 | Musso, Jr. |
| 4,351,481 | A | 9/1982 | Dreyer |
| 4,561,596 | A | 12/1985 | Siwersson et al. |
| 4,583,693 | A | 4/1986 | Harder |
| 4,597,531 | A | 7/1986 | Kise |
| 4,685,619 | A | 8/1987 | Harder |
| 4,697,951 | A | 10/1987 | Allen |
| 4,765,772 | A | 8/1988 | Benedetti et al. |
| 4,886,214 | A | 12/1989 | Musso, Jr. et al. |
| 5,046,664 | A | 9/1991 | Van Der Lely et al. |
| 5,310,119 | A | 5/1994 | Musso, Jr. et al. |
| 5,397,172 | A | 3/1995 | Musso, Jr. et al. |
| 5,400,974 | A | 3/1995 | Musso, Jr. et al. |
| 5,437,499 | A | 8/1995 | Musso |
| 5,466,112 | A | 11/1995 | Feller |
| 5,618,002 | A | 4/1997 | Cervelli et al. |
| 5,772,389 | A | 6/1998 | Feller |
| 5,795,124 | A | 8/1998 | Kitten et al. |
| 5,842,649 | A | 12/1998 | Beck et al. |
| 5,911,362 | A | 6/1999 | Wood et al. |
| 5,944,046 | A | 8/1999 | Hultine |
| 5,961,040 | A | 10/1999 | Traylor et al. |
| 6,027,053 | A | 2/2000 | Anderson et al. |
| 6,089,478 | A | 7/2000 | Truan et al. |
| 6,123,276 | A | 9/2000 | Ungerer et al. |
| 6,149,079 | A | 11/2000 | Kinkead et al. |
| 6,173,904 | B1 | 1/2001 | Doherty et al. |
| 6,186,731 | B1 | 2/2001 | Vickers et al. |
| 6,202,944 | B1 | 3/2001 | McCrory |
| 6,220,532 | B1 | 4/2001 | Manon et al. |
| 6,368,046 | B1 * | 4/2002 | Burnett et al. ............... 414/517 |
| 6,517,281 | B1 * | 2/2003 | Rissi ............................ 404/110 |
| 2005/0279979 | A1 | 12/2005 | Feller |

FOREIGN PATENT DOCUMENTS

| | | |
|---|---|---|
| GB | 2154112 | 2/1984 |
| WO | WO 92/15755 | 9/1992 |

OTHER PUBLICATIONS

Deposition of Alan Royce Grimm taken on Dec. 14, 2004 (154 pages plus a 16-page attachment).
Deposition of David Juette taken on Dec. 14, 2004 (154 pages plus a 16-page attachment).
Deposition of Allan Louis Lorenc taken on Jan. 20, 2005 (187 pages plus a 14-page attachment).
Deposition of Michael Podoll taken on Nov. 3, 2004 (85 pages).
Deposition of John Rathjen taken on Nov. 18, 2003 (308 pages).
Deposition of the Applicant, Matthew William Rissi in two volumes, the first being taken on Feb. 17, 2004, and the second on Nov. 3, 2004 (400 pages).
Deposition of Richard David Serbousek in two volumes, the first being taken on Jun. 17, 2004, and the second on Jun. 18, 2004 (227 pages).
Deposition of Gregory Williams taken on Nov. 4, 2004 (138 pages).
Deposition of John Williams taken on Feb. 18, 2004 (243 pages).
Complaint and Jury Demand (6 pages).
Answer, Affirmative Defenses, Counterclaims and Jury Demand (11 pages).
Answer and Counterclaims of Defendant Doyle Equipment Manufacturing Company (9 pages).
Defendants FECO, Ltd. and Stan Duncalf's Responses to Plaintiff's First Set of Interrogatories (44 pages).
Defendant Doyle Equipment Manufacturing Company's Answers to Plaintiff's First Set of Interrogatories (23 pages).
First Amended Answer, Affirmative Defenses, Counterclaims, and Jury Demand (10 pages).
Second Amended Answer, Affirmative Defenses, Counterclaims, and Jury Demand (12 pages).
Order on FECO's Motion for Partial Summary Judgment and HECO's Motion to Extend Deadlines, Postpone Summary Judgment Hearing, and Reset Trial (31 pages).
Expert Report of Wayne D. Milestone, Ph. D (20 pages).
Expert Witness Report of John Williams (7 pages).
Expert Witness Report of pRofessor Jay P. Kesan (15 pages).
Preliminary Expert Witness Statement of Stephen J. Marley (29 pages).
Supplemental Expert Witness Report of John Williams (6 pages).
Letter and Price Sheets which were sent to Ray-Man Dealers regarding the RM3000 Truck Spreader on May 18, 1983 (6 pages).
Order by Magistrate Judge Jarvey, dated Jul. 26, 2005, in the manner *Highway Equipment COmpany, Inc. v. FECO Ltd., Doyle Equipment Manufacturing Co., and Stan Duncalf.*
Affidavit of Applicant Admitted Prior Art Apr. 9, 2003.

* cited by examiner

ADJUSTABLE SPINNER FOR A PARTICULATE MATERIAL SPREADER

CROSS REFERENCE TO RELATED APPLICATIONS

This patent application is a continuation of U.S. application Ser. No. 10/248,368 filed on Jan. 14, 2003, which is a continuation of U.S. application Ser. No. 09/574,600 filed on May 19, 2000, now U.S. Pat. No. 6,517,281. These prior applications are incorporated herein by reference in their entirety.

BACKGROUND OF INVENTION

Spinner spreaders for particulate material are well known in the art, both for agricultural application, lawn care, and road maintenance application. Typically, such spreaders are mounted onto a truck body, truck chassis, trailer, or slid into a truck's dump body. The spreader includes a material storage bin(s), a conveyor system(s) and rotating spinner(s). The conveyor transfers material from the storage bin(s) to the spinner(s). The spinner(s) broadcast the material across the field, lawn, or road. Usually a single spinner or a pair of laterally spaced spinners are provided, with a material divider plate positioned above the spinner(s) to direct the material from the discharge end of the conveyor(s) onto the spinner(s). A wide range of spinner diameters are in use with a general understanding that the amount of material to be spread and the size of the broadcast area are proportional to the diameter of the spinners.

Recently, a new technology has emerged known as variable rate technology. Unlike the past when it was desirable to apply a constant rate of material per acre or lane mile, variable rate technology advances the benefits of varying rates while moving across the field, lawn, or roadway. As it relates to agriculture, it is now desirable to apply different rates of a material in different grids of the same field in order to obtain optimum pH and/or fertility values over the entire field. As for roadways, it is now common practice, for example, to apply a varying rate of de-icing materials during the winter depending on the grade of the road; increasing rates on steep roads or at intersections while decreasing rates on less traveled or level roads. This new variable rate technology has challenged makers of broadcast spreaders to provide a spreader that can achieve optimum spread patterns while applying varying low and high rates of materials while the spreader is traveling at variable ground speeds (MPH) over the field, lawn or road. Variable ground speeds combined with variable application rates result in a variable amount of material (cubic feet per minute) passing across the spinner(s). As the rate of material changes, it is necessary to change the drop point onto the spinner(s) to achieve optimal spread patterns.

Furthermore, it is common to spread different density materials with the same spreader, which makes it necessary to change the drop point onto the spinner(s) to achieve optimal spread patterns when switching from high to low density material applications.

In conventional prior art spreaders, the drop area of the material from the conveyor(s) is fixed in relationship to the spinner(s). Minor adjustability of the drop area has been accommodated by adjusting the position of a material divider(s) such that the material is deflected by the divider(s) onto a different drop area on the spinner(s). However, such movement of the divider(s) relative to the spinner(s) does not provide uniform material flow through the divider(s) creating difficulty in achieving uniform spread patterns. Furthermore, the aperture of the divider(s) must be large enough to accommodate the highest rate of application lest it would hinder material flow onto the spinner(s). The divider aperture therefore creates a null zone where the divider setting or the divider movement has no consistent affect on the drop area of the material during a change from high to low rate applications. Also, the movement of the divider(s) is substantially limited due to the structure of the divider and/or conveyor and does not allow for the proper material placement on the spinner for achieving optimum spread patterns of both low and high rates of material. Therefore, the limitations of a conventional prior art spreader does not allow achieving optimal spread patterns when applying variable volume rates of material or different densities of material.

Accordingly, a primary objective of the present invention is the provision of an improved particulate material spreader that achieves proper placement of both low and high volumetric and density based rates of material.

Another objective of the present invention is the provision of a particulate material spreader having spinner(s) which are incrementally adjustable, fore and aft, relative to the conveyor(s) discharge end and material divider(s).

A further objective of the present invention is the provision of an improved spreader for agricultural, lawn care, and road maintenance use with uniform material flow from the conveyor(s) discharge end through the material divider(s) and onto the adjustable spinner(s) of the spreader.

Another objective of the present invention is the provision of an improved particulate material spreader wherein the position of the spinner(s) is quickly and easily adjustable.

A further objective of the present invention is the provision of spinner(s) for particulate material spreader which can be manually adjusted to accommodate varying low and high application rates of material onto an area, such as a field, lawn or road.

Another objective of the present invention is the provision of an improved particulate material spreader to automatically adjust the spinner(s) position, fore and aft in relationship to the conveyor discharge end and material divider, based on the rate being applied while the spreader is moving over the field, lawn, or road at either fixed or variable ground speeds (MPH).

These and other objectives will become apparent from the following description of the invention.

SUMMARY OF INVENTION

The adjustable spinner of the present invention is adapted for use with a spreader for broadcasting particulate material onto a field, lawn, road, or other area. The spinner includes a frame which is adapted to be adjustably mounted to the spreader beneath a conveyor discharge end and a material divider. Spinner disc(s) and blades are rotatably mounted on the spinner frame and adapted to receive material from the conveyor through the material divider and broadcast the material as the truck or trailer moves through the field, lawn, or along a road. The position of the spinner(s) relative to the conveyor discharge end and material divider is adjustable, either manually or automatically, with or without automatic position feedback, by any number of means such as mechanical, electrical, pneumatic, or hydraulic, so as to adjust the drop point of the material onto the spinner(s), and thereby accommodate varying application rates of the particulate material.

DETAILED DESCRIPTION

Figure 1:
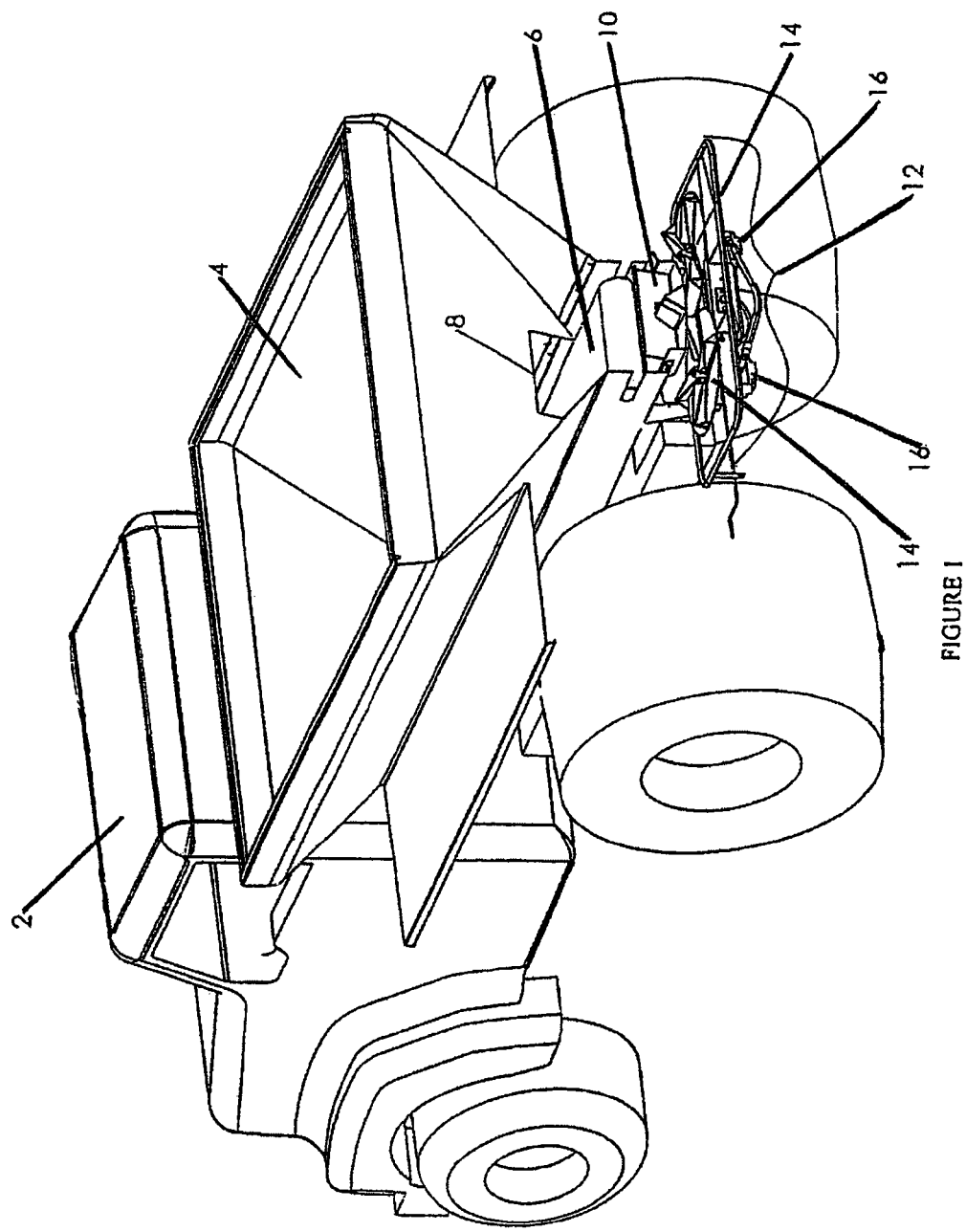
FIG. 1 is an overview of a truck mounted material storage box, divider, and spinner spreader.

FIG. 1 is a somewhat diagrammatic perspective view of a truck for spreading particulate material generally designated 2. The truck 2 includes a material storage bin 4 with sloping side walls and a belt conveyor 6 for transporting material to the discharge opening 8. Mounted at the rear of the material storage bin 4 at the discharge end of the conveyor is a material divider 10. Mounted below the material divider 10 is the spinner spreader apparatus generally designated 12.

The spinner spreader 12 of FIG. 1 consists of spinners 14 mounted to motors 16 positioned to accept materials falling from the conveyor end 18 and through material divider 10.

The above described structure is conventional and does not constitute a part of the present invention.

Figure 2A:
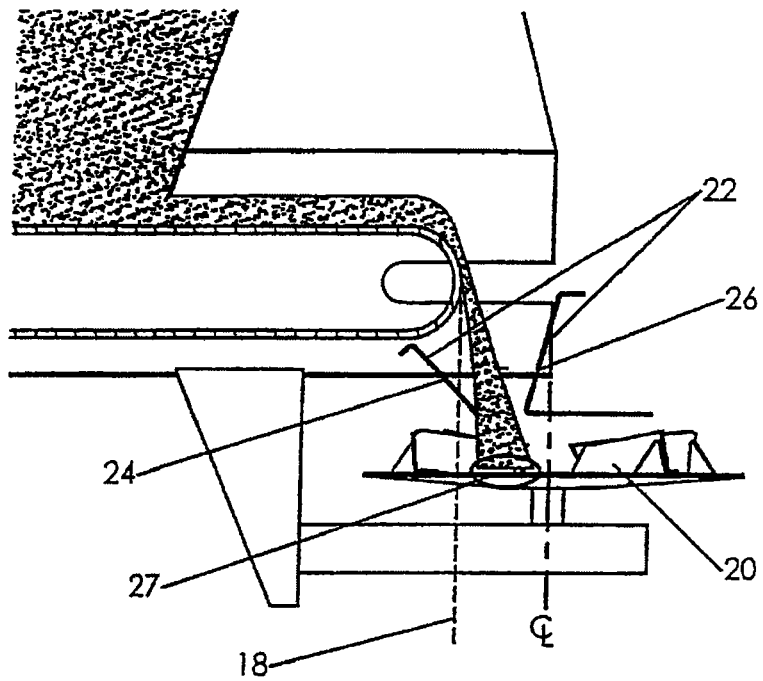
FIG. 2A is a prior art cross section view of the discharge area, divider, and spinner with divider in a forward position.

FIG. 2A is a somewhat diagrammatic longitudinal section view of conventional prior art showing a spinner 20 fixed in relative position to the conveyor end 18 and a moveable material divider 22 in a full forward position with a quantity of material falling through the divider aperture without influence from the divider front surface 24 or rear surface 26. It is obvious that the divider would need to move significantly rearward before affecting where this quantity of material is dropped onto the fixed position spinner 20. At the same time, a larger quantity of material flowing from conveyor end 18 may strike the rear surface 26 of the divider. There is no consistent relationship between the drop area 27 on the spinner, the material flow and divider setting.

Figure 2B:
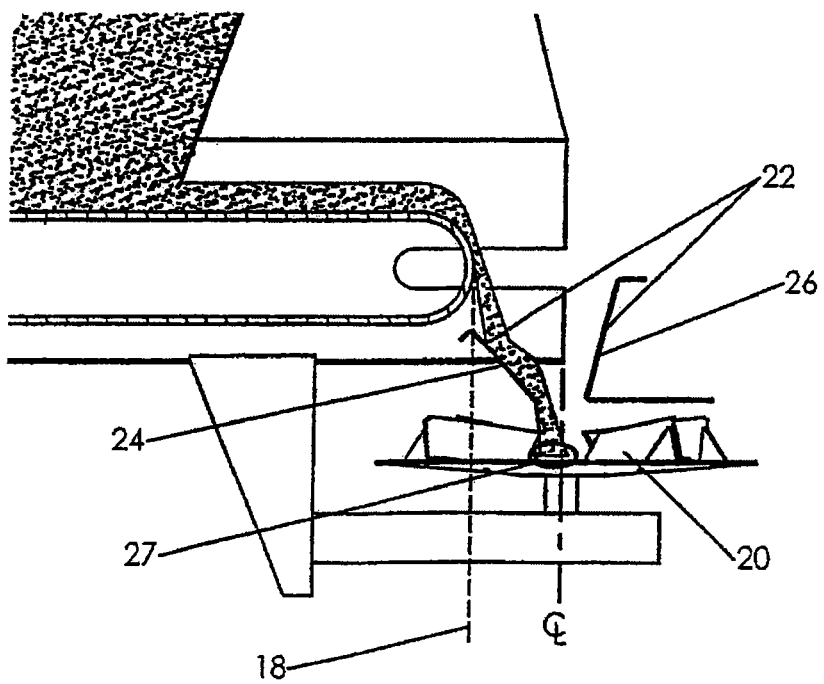
FIG. 2B is a prior art cross section view of the discharge area, divider, and spinner with divider in a rearward position.

FIG. 2B is a somewhat diagrammatic longitudinal section view of conventional prior art similar to FIG. 2A, but showing a moveable material divider 22 in a rearward position with material falling through the divider aperture with influence from the divider front surface 24. It is obvious that the divider front surface 24 would affect the shape of the column of material as the divider 22 is moved fore and aft. The drop area 27 on the fixed spinner 20 changes accordingly with the shape of the material column.

Figure 3A:
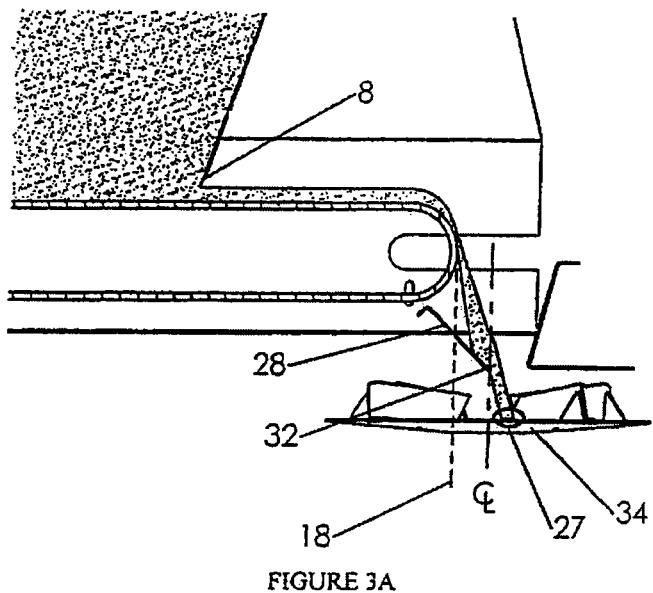
FIG. 3A is a cross section view of the discharge area, fixed position divider, and adjustable spinner(s) in a forward position.

FIG. 3A is a somewhat diagrammatic longitudinal section view of the present invention showing material falling from the conveyor end 18 onto the front surface 28 of a fixed divider 30, off a fixed drop edge 32, through the front part of the divider aperture, and at a drop point 27 on a moveable spinner 34 shown in a forward position. Divider 30 is not required for the present invention to operate as intended. With divider 30 removed, the conveyor end 18 will serve the same function as the fixed drop edge of a divider.

Figure 3B:
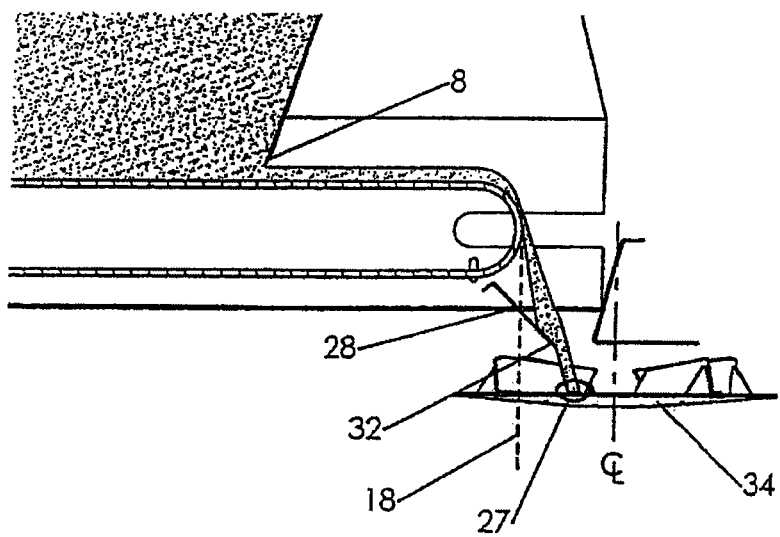
FIG. 3B is a cross section view of the discharge area, fixed position divider, and adjustable spinner(s) in a rearward position.

FIG. 3B is a somewhat diagrammatic longitudinal section view of the present invention showing material falling from the conveyor end 18 onto the front surface 28 of a fixed divider 30, off a fixed drop edge 32, through the front part of the divided aperture, and at a drop point 27 on a moveable spinner 34 shown in a rearward position. It is obvious that the material is falling in the same column shape as shown in FIG. 3A but landing at a drop point 27 further forward on the spinner. Because the material strikes the divider 30 consistently, the material arrives at the moveable spinner 34 consistently and will thus have a spread pattern consistent and repeatable with the location of moveable spinner 34 in relation to divider surface 28 and the fixed drop edge 32.

Figure 4:
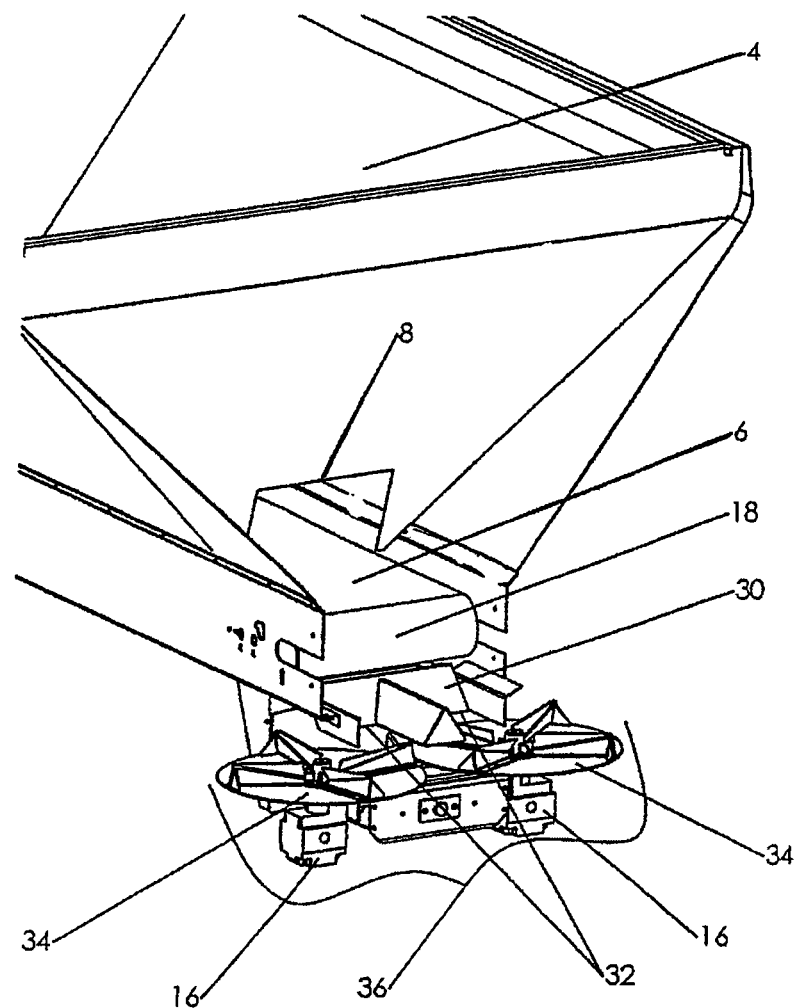
FIG. 4 is a perspective view of a dual spinner configuration.

The present invention of the improved spreader generally designated 36 is shown in the perspective view of FIG. 4 in a dual spinner configuration. Material from storage bin 4 is conveyed through discharge opening 8 by conveyor 6 until the material falls from conveyor end 18 onto the front surface of fixed divider 30. The fixed divider 30 is mounted to the storage box 4 in a position fixed relative to the end of conveyor 18. The material further falls through the divider aperture along the same front edge, or drop edge 32, of divider 30 and onto the moveable spinners 34. It is the fixed drop edge 32 of the divider 30 that results in a consistent drop point 27 of material onto the moveable spinners 34. The spinners are rotated by motors 16 from below. The spinners rotate in opposite directions. The spinners and motors are moveable fore and aft relative to the fixed divider 30.

Figure 5A:
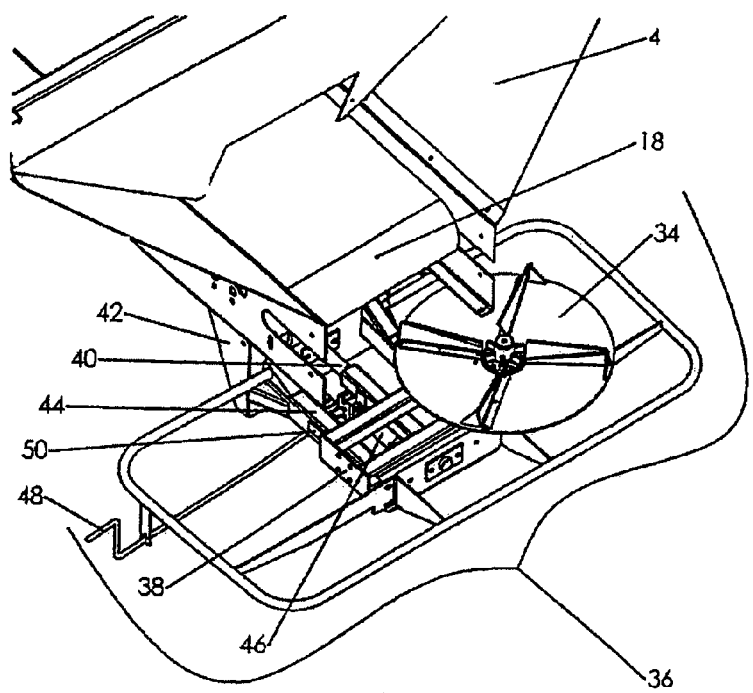
FIGS. 5A, 5B and 5C are perspective views of a dual spinner configuration with one spinner, spinner motor, and divider removed.
Figure 5B:
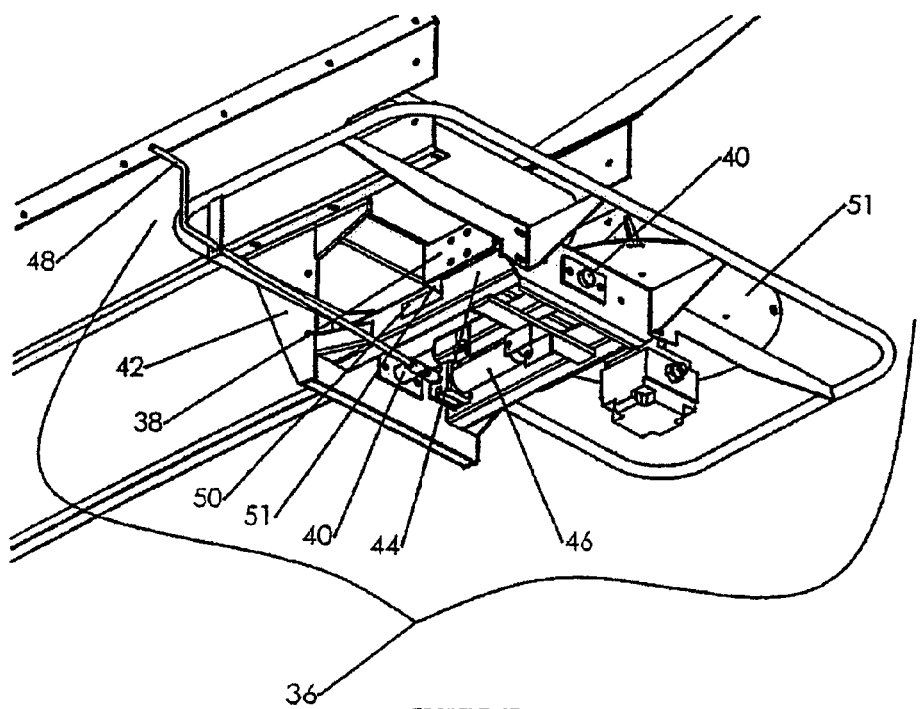
Figure 5C:
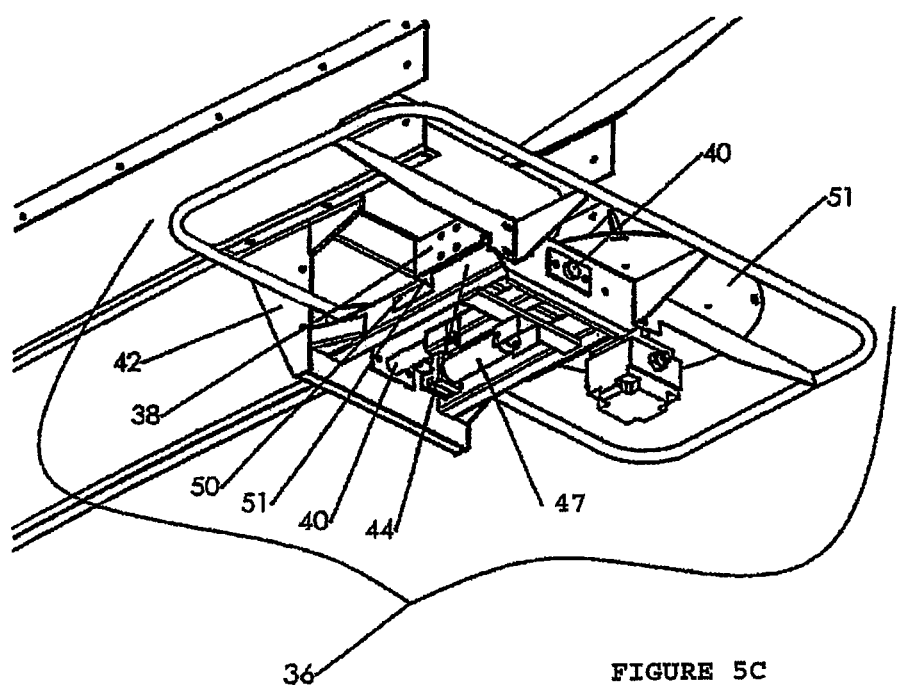

FIGS. 5A and 5B are upper and lower perspective views of the present invention in a dual spinner configuration spreader generally designated 36 with one spinner 34, spinner motor 16, and the fixed divider 30 of FIG. 4 removed. The spinners and motors are mounted to a subframe 38. In this configuration, the subframe 38 with mounted motors and spinners, is moveable fore and aft along longitudinal shaft 40 secured to main supporting frame 42. Further, the subframe 38 rests on longitudinal members 44 of the main supporting frame 42. The main supporting frame 42 is mounted to the storage bin 4 and is fixed in position relative to the conveyor end 18 and divider drop edge. In this configuration, fore and aft movement of the subframe 38 and the associated motors and spinners is accomplished through means of a screw jack 46 or, for example, hydraulic cylinder 47 as shown in FIG. 5C, placed between the main supporting frame 42 and subframe 38. In manually operated form, the operator of the spreader can adjust the position of the spinners relative to the conveyor end and divider drop edge by extending or collapsing the screw jack 46 by means of a rotatable handle 48. Location of the spinners relative to the drop edge is indicated by scale 50 and pointer 51.

When using laterally spaced spinners having opposite rotation, the operator can adjust for higher or lower application rates by moving the spinners 34 forward or rearward with respect to the fixed drop edge 32 of the fixed divider 30.

Figure 6B:
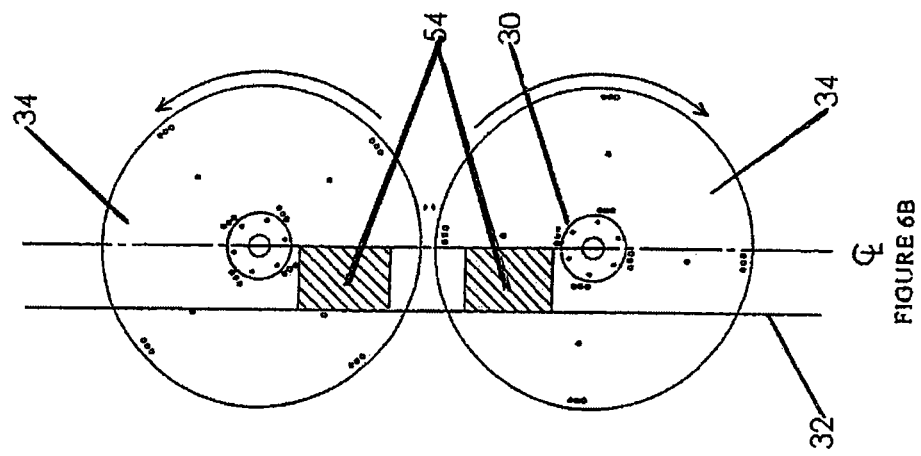
FIG. 6B is a top view of spinners in a forward position.
Figure 6A:
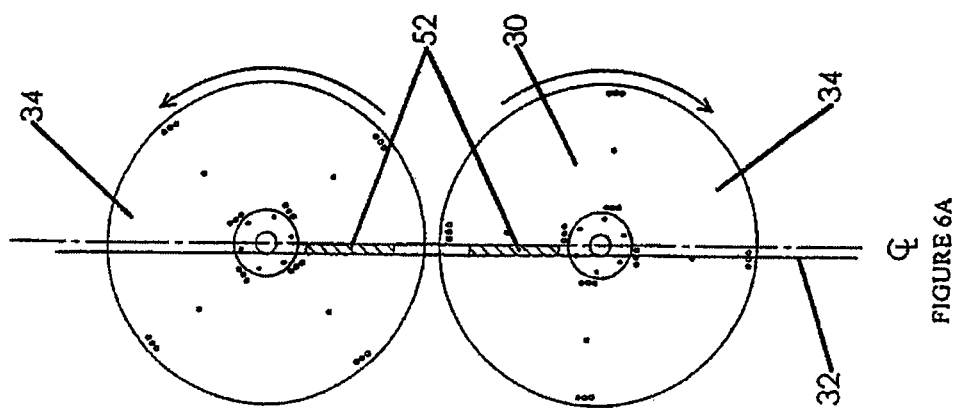
FIG. 6A is a top view of spinners in a rearward position.

FIG. 6A is a top view of the spinners of the present invention depicting a low application rate with a small column of material, represented by hatched sections 52, which has passed over the front surface of the divider, off the drop edge 32 and onto the spinners 34. The spinners 34 are retracted forwardly such that the small column of material 54 has a drop point near the spinners centerline. Furthermore, as the rate of material is reduced, the material would be introduced later in respect to the spinner's rotation. For any spinner rotation, as the rate of material is reduced, the column of material 52 and the associated drop point, would move in the same direction as the spinner rotation.

FIG. 6B is a top view of the present invention showing a higher application rate, which has a larger column of material, represented by hatched sections 54. The spinners 34 are moved rearwardly such that the added volume of material is introduced earlier in respect to the spinner's rotation. The center of the drop point moves in a direction opposite the spinner rotation. For any spinner rotation, as the rate of material is increased, the column of material 54 and the associated drop point, would move in the direction opposite the spinner rotation.

The spinners 34 can be adjusted to any position between full extension and full retracted positions to accommodate various application rates of materials. Spinner location is also adjustable to accommodate varying material densities. The accurate adjustability of the spinners allow for a more accurate deposit of material onto the spinners, and thus more accurate application of the material onto the field, lawn, or road.

In an automatically adjustable form, the screw jack 46 of FIGS. 5A and 5B is replaced with any number of actuating means, such as mechanical electrical actuators, pneumatic cylinders, or hydraulic cylinders, with a positive feed back to control spinner location from the operator's driving position or other remote location. The operator can immediately adjust the spinner position for accurate broadcast of material based on an application rate.

Figure 7B:
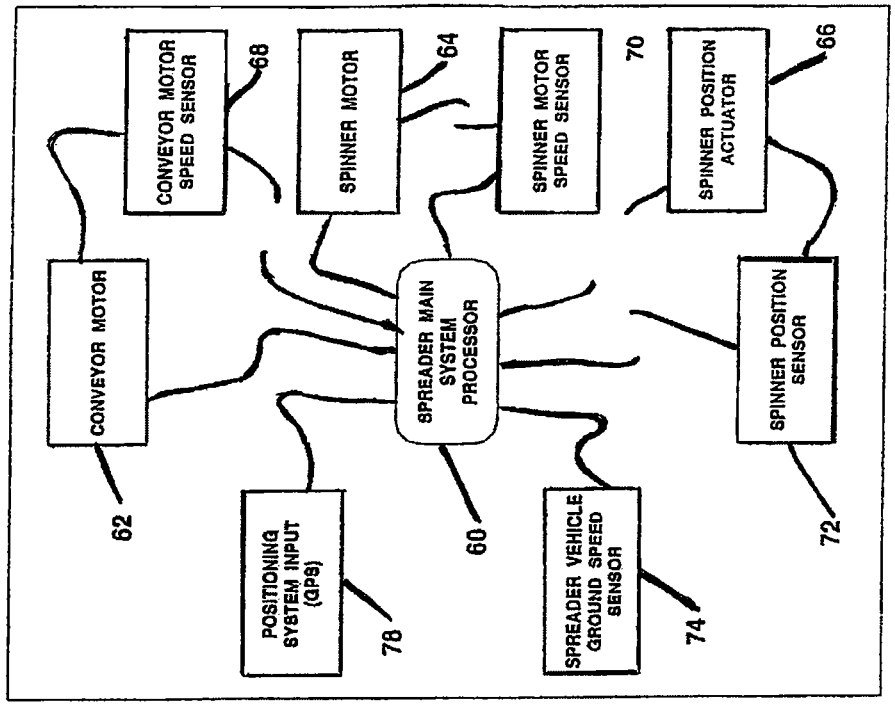
FIG. 7B is a logic schematic of an automatic control for variable rate applications driven by a positioning system such as GPS.
Figure 7A:
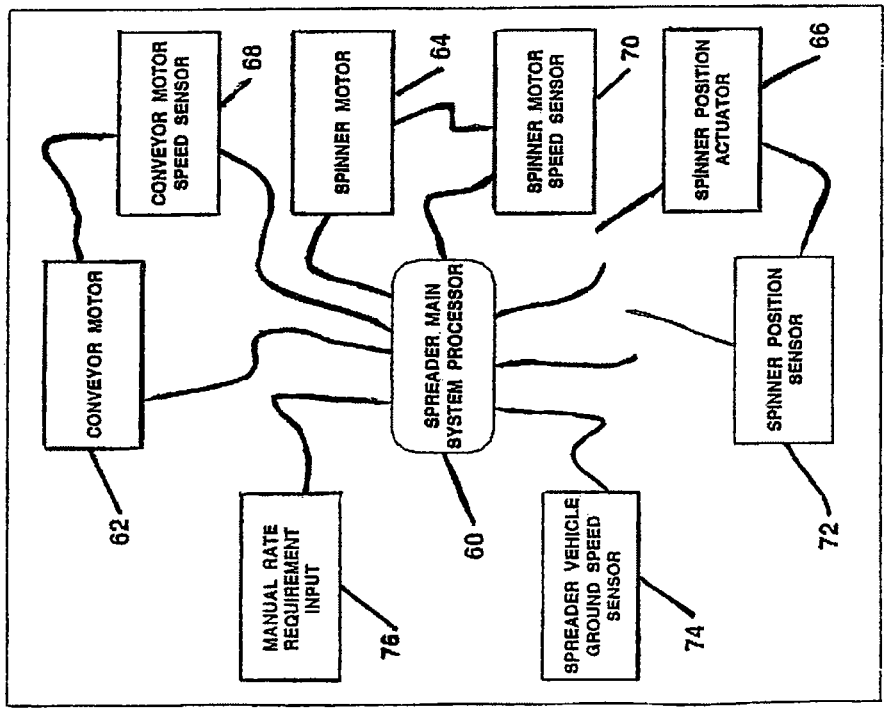
FIG. 7A is a logic schematic of an automatic control for variable ground speed.

FIG. 7A is a logic flow chart of a general type of control for the remote adjustment just described. Spreader main system processor 60 controls conveyor motor 62, spinner motor 64, and spinner position actuator 66 by constantly monitoring conveyor speed sensor 68, spinner rotation speed sensor 70, spinner position actuator sensor 72 and vehicle ground speed sensor 74 to meet the rate requirements 76 manually input by the operator to meet predetermined material application rates. When a new rate requirement 76 is input, the main system processor 60 adjusts one or more of the conveyor motor speed 62, spinner speed 64, and spinner position actuator 66 until feedback from conveyor speed sensor 68, spinner speed sensor 70, and spinner position actuator sensor 66 meet programmed requirements for the new rate for any given vehicle speed from sensor 74. Specifically, it is the ability to change the drop point onto the spinners that allow for optimum spread patterns.

In a further automatically adjustable form, the screw jack 46 is replaced with any number of actuating means, such as mechanical electrical actuators, pneumatic cylinders, or hydraulic cylinders, with a positive feed back to control spinner location and thereby adjusting automatically for variable rate technology application of the particulate material. In this case, the spinner location is changed as the spreader is moving about the field, lawn or along the roadway for accurate broadcast of material based on predetermined application rates and position knowledge gained from a location positioning system such as a common Global Positioning System (GPS).

FIG. 7B is a logic flow chart of a general type of control for variable rate technology. With variable rate technology, the spreader main system processor 60 controls conveyor motor 62, spinner motor 64, and spinner position actuator 66 by constantly monitoring conveyor speed sensor 68, spinner rotation speed sensor 70, spinner position actuator sensor 72 and vehicle ground speed sensor 74, and a positioning system such as a common Global Positioning System 78. The addition of the positioning system and a set of predetermined variable application rate needs for a field grid or roadway gives the spreader the information necessary to apply different rates of material at variable ground speeds. However, it is the ability to consistently change the effective material drop point on the spinners that allows a spreader to achieve the optimal spread patterns needed for the variable ground speeds and high to low application rates. Therefore, as the spreader is moving about the field, lawn or along the roadway, the main system processor 60 constantly monitors and adjusts the spinner position for best results with regard to application rates based on the positioning system's location information and vehicle ground speed.

I claim:

1. A spinning spreader apparatus for spreading particulate matter, said spinning spreader apparatus configured for attachment to a vehicle, said spinning spreader apparatus comprising:

at least one spinner disk connected to at least one motor, said at least one motor positioned underneath said at least one spinner disk for rotating said at least one spinner disk about an axis, said axis having an orientation that is fixed relative to a substantially horizontal plane, said at least one spinner disk adapted to being located outside of a material storage bin mounted to said vehicle and below a discharge opening for said particulate matter in said material storage bin, said at least one spinner disk being translatably movable fore and aft in said substantially horizontal plane to a plurality of operating positions while maintaining said orientation of said axis relative to said substantially horizontal plane throughout said plurality of operating positions for adjustably spreading said particulate matter;

a spinner subframe supporting said at least one spinner disk from beneath said at least one spinner disk, said subframe adapted to be connected to said material storage bin to permit said translatable movement of said at least one spinner disk and said subframe relative to said discharge opening; and a force transmission device connected to said spinner subframe for adjustably positioning said at least one spinner disk fore and aft relative to said discharge opening throughout said plurality of operating positions wherein said spinning spreader apparatus comprises at least two spinner disks adapted to be positioned under said discharge opening, wherein each of said at least two spinner disks are connected to respective ones of at least two motors positioned underneath each of said at least two spinner disks.

2. The apparatus of claim 1, further including a fixed diverter operable to deflect said particulate matter exiting said material storage bin onto each of said at least two spinner disks.

* * * * *